US007784021B2

(12) United States Patent
Boyette et al.

(10) Patent No.: US 7,784,021 B2
(45) Date of Patent: Aug. 24, 2010

(54) METHOD FOR SPECIFYING, DEPLOYING AND DYNAMICALLY UPDATING WORK FLOWS

(75) Inventors: Neil Harold Arthur Boyette, Oregon City, OR (US); Isaac Kam-Chak Cheng, San Jose, CA (US); Vikas Krishna, San Jose, CA (US); Savitha Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 11/415,788

(22) Filed: May 2, 2006

(65) Prior Publication Data

US 2007/0260500 A1 Nov. 8, 2007

(51) Int. Cl.
*G06F 9/45* (2006.01)
(52) U.S. Cl. ...................................... 717/101
(58) Field of Classification Search .................. 717/101
See application file for complete search history.

(56) References Cited

U.S. PATENT DOCUMENTS 5,974,118 A 10/1999 Capriotti et al.
6,094,655 A 7/2000 Rogers et al.
6,100,891 A 8/2000 Thorne (Continued)

OTHER PUBLICATIONS

Boyette, et al.; Eclipse Modeling Framework For Document Management; DocEng'05; Nov. 2-4, 2005; Bristol, United Kingdom; ACM 1-59593-240; pp. 220-222.

(Continued)

*Primary Examiner*—John Chavis
(74) *Attorney, Agent, or Firm*—Schmeiser, Olsen & Watts

(57) ABSTRACT

A method for specifying, deploying and updating work flows. A work flow comprising manual and automatic steps is created in a computing system A first XML schema set represents the automatic steps. The XML schemas in the first XML schema set identify software routines for performing the automatic steps. A second XML schema set represents the manual steps. The XML schemas in the second XML schema set include instructions directing human representatives to perform the manual steps. A runtime component executes the first and second XML schema sets. Without terminating the runtime component, a manual step is represented in an XML schema to be added to the first set. Representing the manual step includes transforming the manual step into an automatic step represented in the XML schema and adding to the XML schema a class name and method name identifying a software routine that performs the automatic step.

1 Claim, 9 Drawing Sheets

U.S. PATENT DOCUMENTS

| | | | |
|---|---|---|---|
| 6,148,277 | A | 11/2000 | Asava et al. |
| 6,181,935 | B1 | 1/2001 | Gossman et al. |
| 6,550,054 | B1 * | 4/2003 | Stefaniak .................... 717/104 |
| 6,587,556 | B1 | 7/2003 | Judkins et al. |
| 6,785,741 | B1 | 8/2004 | Mandalia et al. |
| 6,795,535 | B1 | 9/2004 | Weeren et al. |
| 6,879,685 | B1 | 4/2005 | Peterson et al. |
| 6,885,734 | B1 | 4/2005 | Eberle et al. |
| 6,914,962 | B2 | 7/2005 | Neary |
| 7,533,107 | B2 * | 5/2009 | Gupta et al. ....................... 1/1 |
| 7,676,786 | B2 * | 3/2010 | Shenfield et al. ............ 717/104 |
| 2003/0188293 | A1 * | 10/2003 | Boucher ..................... 717/114 |
| 2003/0227392 | A1 * | 12/2003 | Ebert et al. ............ 340/825.49 |
| 2004/0005042 | A1 | 1/2004 | Dhara et al. |
| 2004/0225499 | A1 | 11/2004 | Wang et al. |
| 2005/0204347 | A1 * | 9/2005 | Jurkiewicz et al. .......... 717/137 |
| 2006/0017947 | A1 * | 1/2006 | Wang et al. ................ 358/1.13 |

OTHER PUBLICATIONS

Cheng, et al.; Exploiting XML Technologies for Intelligent Document Routing; DocEng'05; Nov. 2-4, 2005; Bristol, United Kingdom; ACM 1-59593-240; 3 pages.

* cited by examiner

400

```
<Action id="a9">
  <ManualDataProcessing id="mdp9" request="Is this case in reference to our EC letter?" responseVariable="inRefToECLetter" responseDatatype="boolean"/>
    <Branch id="b5">
      <ControlFlowFromBranch next="a11" id="cffb9">
        <GuardCondition id="g9">
            <Property id="p9" name="inRefToECLetter" value="false" datatype="boolean"/>
        </GuardCondition>
      </ControlFlowFromBranch>
      <ControlFlowFromBranch next="a12" id="cffb10">
        <GuardCondition id="g10">
            <Property id="p10" name="inRefToECLetter" value="true" datatype="boolean"/>
        </GuardCondition>
      </ControlFlowFromBranch>
    </Branch>
</Action>
```

```
<Action id="a11">
    <AutomatedDataProcessing methodName="lookup"
className="com.ibm.services.EntitlementDatabase" id="adp11">
        <Input id="i11">
            <Properties id="ps11i">
                    <Property id="p11i1" name="customerId"/>
                    <Property id="p11i2" name="requestType"/>
                    <Property id="p11i3" name="subRequestType"/>
                    <Property id="p11i4" name="serviceObjectId"/>
            </Properties>
        </Input>
        <Output id="o11">
            <Properties id="ps11o">
                    <Property id="p11o1" name="serviceEntitlementObject"
datatype="com.ibm.services.Entitlement"/>
            </Properties>
        </Output>
        <DataProcessingException id="dpe11"
name="com.ibm.services.EntitlementDatabaseException" description="Lookup failed."/>
    </AutomatedDataProcessing>
```

```
<Action id="a9">
  <ManualDataProcessing id="mdp9" request="Is this client entitled for this type of
service? Look up the pertinent paperwork in file." responseVariable="isEntitled"
responseDatatype="boolean"/>
  <Branch id="b5">
   <ControlFlowFromBranch next="a11" id="cffb9">
    <GuardCondition id="g9">
        <Property id="p9" name="isEntitled" value="false" datatype="boolean"/>
    </GuardCondition>
   </ControlFlowFromBranch>
   <ControlFlowFromBranch next="a12" id="cffb10">
    <GuardCondition id="g10">
        <Property id="p10" name="isEntitled" value="true" datatype="boolean"/>
    </GuardCondition>
   </ControlFlowFromBranch>
  </Branch>
</Action>
```

FIG. 7

METHOD FOR SPECIFYING, DEPLOYING AND DYNAMICALLY UPDATING WORK FLOWS

BACKGROUND OF THE INVENTION

1. Technical Field

The present invention relates to a method and system for specifying, deploying and dynamically updating work flows, and more particularly to a technique for dynamically updating a work flow by dynamically transforming a manual step of the work flow into an automatic step.

2. Related Art

In a conventional rule-based routing system utilized by a help center, each request by a customer is routed to an appropriate customer service representative according to a set of business rules so that appropriate services can be provided to the customer. The routing system is represented by a decision tree with nodes corresponding to automated steps that route requests and leaf nodes corresponding to manual steps that service requests. The conventional data processing representations of the automated steps and the manual steps are non-uniform and are developed separately, often being managed by different software applications. Deficiencies of conventional routing systems related to this non-uniformity and separate development include (1) inefficient duplicate provision of information needed by both the automated steps and the manual steps (e.g., the customer's account number is entered once on a telephone keypad and again provided to a customer service representative by voice); (2) complicated creation and maintenance of the logic of applications managing the automated and manual steps; and (3) expensive and time-consuming customized integration of the different applications managing the automated and manual steps. Furthermore, known routing systems inadequately represent the problem-solving steps utilized by a customer service representative. Thus, there exists a need to overcome at least one of the preceding deficiencies and limitations of the related art.

SUMMARY OF THE INVENTION

In first embodiments, the present invention provides a system for specifying, deploying and updating work flows in a computing environment, the system comprising:

means for receiving a request from a user of a system comprising a plurality of components, the plurality of components including a computing system and one or more representatives, the computing system including one or more computing applications, the one or more representatives being human, and the plurality of components facilitating a routing of the request and a servicing of the request;

means for specifying a work flow, the work flow being an ordered set of steps for performing the routing and the servicing, the set of steps comprising one or more automatic steps and one or more manual steps, the one or more automatic steps performed by the one or more computing applications and the one or more manual steps performed by the one or more representatives;

means for uniformly defining the one or more automatic steps and the one or more manual steps in a single general-purpose markup language;

means for deploying the work flow to a data repository at which the work flow is available for a retrieval that facilitates an execution of the set of steps; and means for updating one or more steps of the set of steps in response to the deploying.

In second embodiments, the present invention provides a computer-implemented method of updating steps of a work flow in a computing system, the method comprising:

creating a work flow in a computing system, the work flow being an ordered set of steps capable of performing a routing of a request initiated by a user of the computing system and a servicing of the request, the set of steps comprising one or more automatic steps and one or more manual steps, the one or more automatic steps to be performed by one or more computing applications included in the computing system, and the one or more manual steps to be performed by one or more representatives who are human;

representing the one or more automatic steps in a first set of one or more XML schemas in a one-to-one correspondence, wherein each XML schema of the first set includes an identifier of a software routine to be executed to automatically perform a corresponding automatic step of the one or more automatic steps;

representing the one or more manual steps in a second set of one or more XML schemas in a one-to-one correspondence, wherein each XML schema of the second set includes an instruction directing a representative of the one or more representatives to perform a corresponding manual step of the one or more manual steps, and does not include an identifier of a software routine to be executed to automatically perform the corresponding manual step;

executing the work flow, the executing the work flow including executing the first set and executing the second set to facilitate performing the routing and the servicing, wherein the executing the work flow is performed by an execution of a runtime component of the computing system; and representing a manual step of the one or more manual steps in an XML schema to be added to the first set, the representing the manual step including transforming the manual step into an automatic step represented in the XML schema, the XML schema including a first identifier of a first software routine to be executed to facilitate automatically performing the automatic step.

Computer program products corresponding to the above-summarized system and method are also described and claimed herein.

Advantageously, the present invention provides a work flow specification, deployment and update technique that facilitates a complete automation of a global call management system to lower operation costs. Further, the present invention increases availability and scalability of the global call management system.

BRIEF DESCRIPTION OF THE DRAWINGS

FIG. 4 is an XML action element representing a manual step of a work flow capable of being specified, deployed and dynamically updated by the system of FIG. 2, in accordance with embodiments of the present invention.

FIG. 5 is an XML action element representing an automatic step of a work flow capable of being specified, deployed and dynamically updated by the system of FIG. 2, in accordance with embodiments of the present invention.

FIG. 7 is an XML action element representing a manual step of a work flow to be updated so that the manual step is transformed into the automatic step of FIG. 5, in accordance with embodiments of the present invention.

DETAILED DESCRIPTION OF THE INVENTION

Overview

The present invention provides a framework in a computing system that specifies, deploys and dynamically updates a work flow. Both automatic and manual steps of the work flow are represented in a general-purpose markup language to allow the dynamic updating of a manual step to an automatic step.

As used herein, a work flow is defined as an ordered set of steps in which each step is modeled by a representation that indicates (1) a task to be performed in a process provided by a help center (e.g., global call management system), and (2) the entity that performs the task. The steps of a work flow systematically guide a user's request for a service from receipt of the request to provision of the service.

As used herein, a help center is defined as a system that includes both a computing system comprising one or more computing applications and one or more human representatives. A help center receives a request for a service from a user of the system, routes the request to an appropriate representative, and provides the requested service. The help center receives the request from the user, for example, in a voice format via a telephone system, or in a web-based format, email, or instant message via the Internet. For instance, a customer of a computing device manufacturer uses a telephone system to call a global call management system provided by the manufacturer. The customer's call provides a request to resolve a problem the customer is having with a computing device.

As used herein, an automatic step of a work flow is defined as a step entirely performed by the one or more computing applications of a help center. Herein, an automatic step is also referred to as an automatic data processing step or automatic processing step. A manual step of a work flow is defined as a step that is performed manually by the one or more human representatives.

Figure 1A:
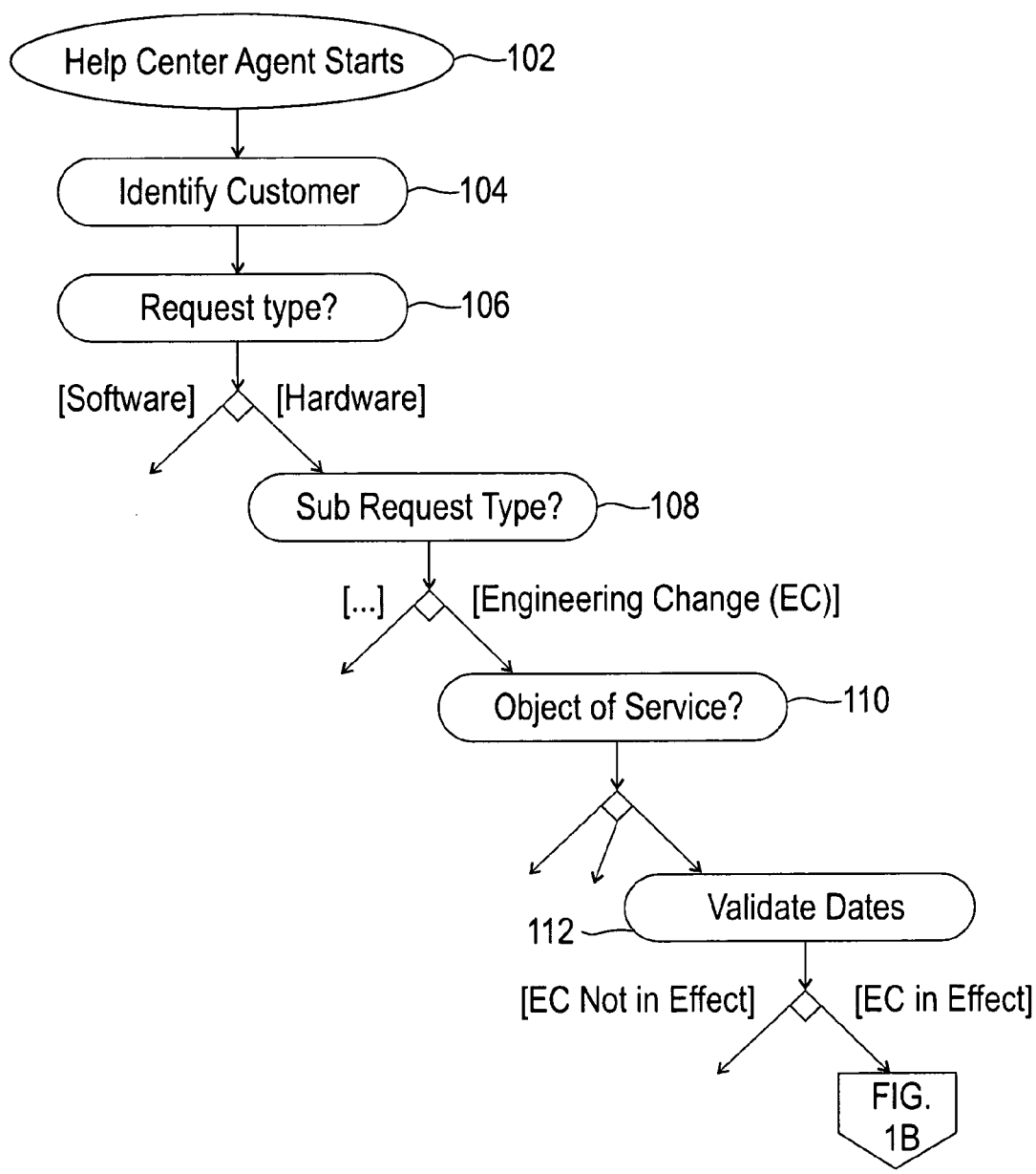
FIGS. 1A-1B depict part of an exemplary graph representation of a work flow, in accordance with embodiments of the present invention.
Figure 1B:
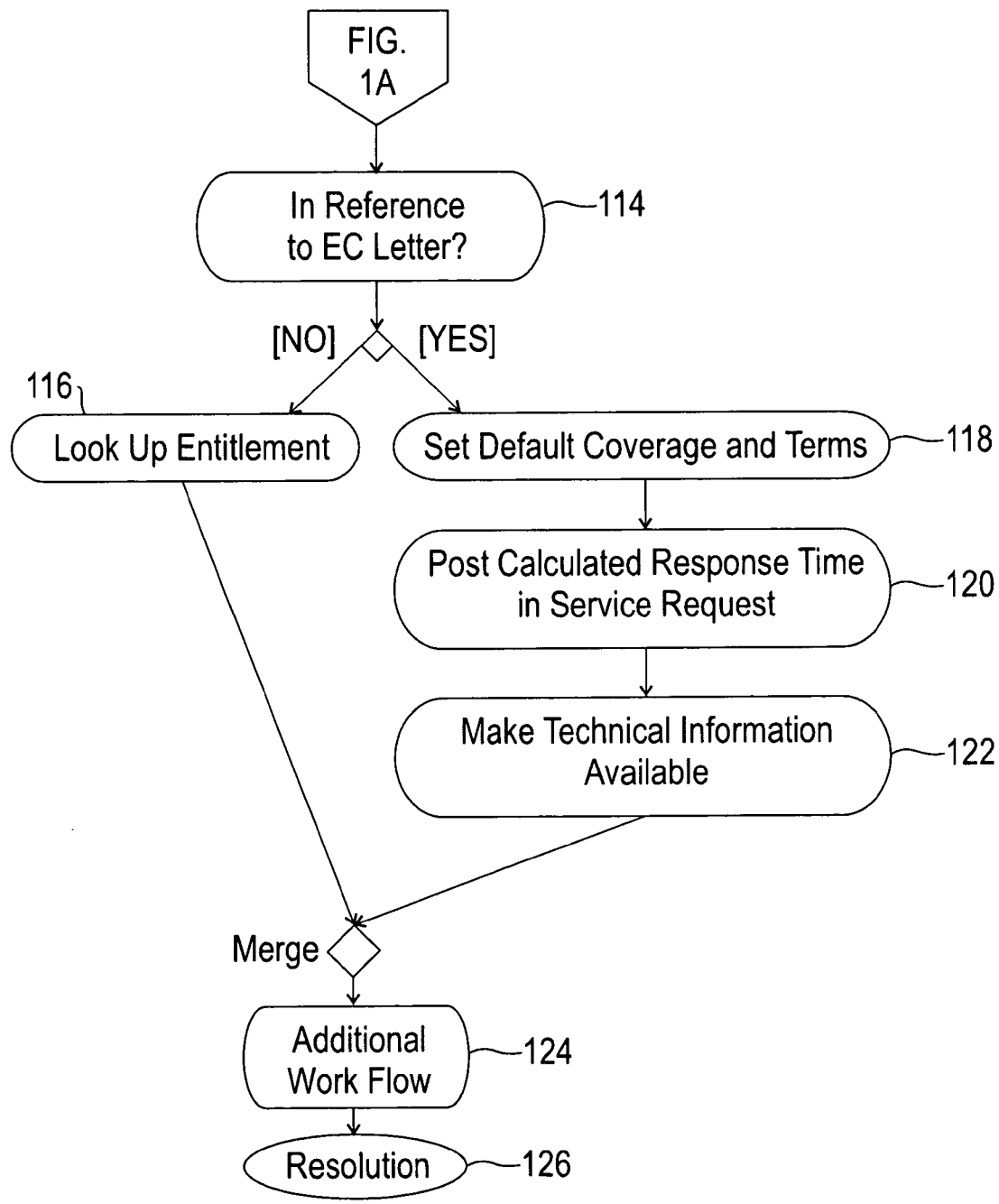

FIGS. 1A-1B depict a portion of a graph representation of a work flow, in accordance with embodiments of the present invention. A graph representation of a work flow is a directed acyclic graph (DAG) (see, e.g., work flow 100). A DAG is a directed graph with no path that starts and ends at the same vertex. A directed graph is a graph whose edges are ordered pairs of vertices. That is, each edge of a directed graph can be followed from one vertex to another vertex.

Work flow 100 includes steps 102-126 depicted in FIGS. 1A & 1B. The steps of work flow 100 provide a service to a customer of a computer-related company in response to a request by the customer. A help center software agent initiates the steps of work flow 100 at step 102. The customer who is requesting a service, the type of service requested (e.g., software or hardware), the sub request type, and the object of the service are identified in steps 104, 106, 108 and 110 respectively. A sub request type shown in FIG. 1A is an Engineering Change (EC). An EC is any change in computer hardware, such as a change in a network interface card from Token Ring to Ethernet. In step 112, dates are validated. That is, the current date is compared to a period of time during which the EC is in effect to determine if the EC is currently in effect.

Continuing the steps of work flow 100 in FIG. 1B, inquiry step 114 determines if the request is in reference to an EC letter. If inquiry step 114 determines that the request is not in reference to an EC letter, then an entitlement lookup is performed in step 116. An entitlement lookup in step 116 can be, for example, a manual step that displays a message to instruct a customer service representative to manually look up appropriate paperwork. The manual lookup determines whether the customer making the request is entitled to the service requested. Alternatively, the entitlement lookup step is an automatic step performed automatically by a computer application that executes a lookup of a database to determine whether the customer is entitled to the service. Returning to inquiry step 114, if the request is determined to be in reference to an EC letter, then default coverage and terms are set, a calculated response time is posted in the service request, and technical information is made available in steps 118, 120 and 122, respectively. Work flow 100 merges following steps 116 and 122, and additional work flow steps are performed in collective step 124. The work flow ends at a resolution of the customer's request at step 126.

As shown by work flow 100, a work flow is more general than a tree structure that represents a simple rule-based routing system. First, a work flow is represented as a DAG rather than a tree. A DAG may or may not be a tree. Work flow 100, for example, is not represented as a tree, as the node labeled "Merge" has two parent nodes (i.e., steps 116 and 122). Second, steps that are performed manually (a.k.a. manual steps or manual nodes) in a work flow are not limited to being leaf nodes of the work flow graph representation. Instead, manual steps can be any step in the work flow. Further, a step subsequent to a manual step in a work flow can be a manual step or an automatic step. As one example, inquiry step 114 of work flow 100 can be a manual step (e.g., a customer service representative manually determines if the request is in reference to an EC letter), but step 114 is not a leaf node of the graph representation shown in FIGS. 1A-1B.

A work flow also differs from a simple rule-based routing system in terms of the structuring of routing steps (e.g., steps that route a customer's request to the appropriate human representative), and servicing or problem-solving steps (e.g., steps that service the request and/or solve the customer's problem). Examples of routing steps include steps 106 and 108 of work flow 100. Examples of servicing requests can include steps 114 and 116. A work flow's structure integrates routing steps with servicing steps. In contrast, a simple rule-based routing system separates routing steps from servicing steps, often utilizing one computing application to manage routing steps and another computing application to manage servicing steps.

Work Flow Framework

Figure 2:
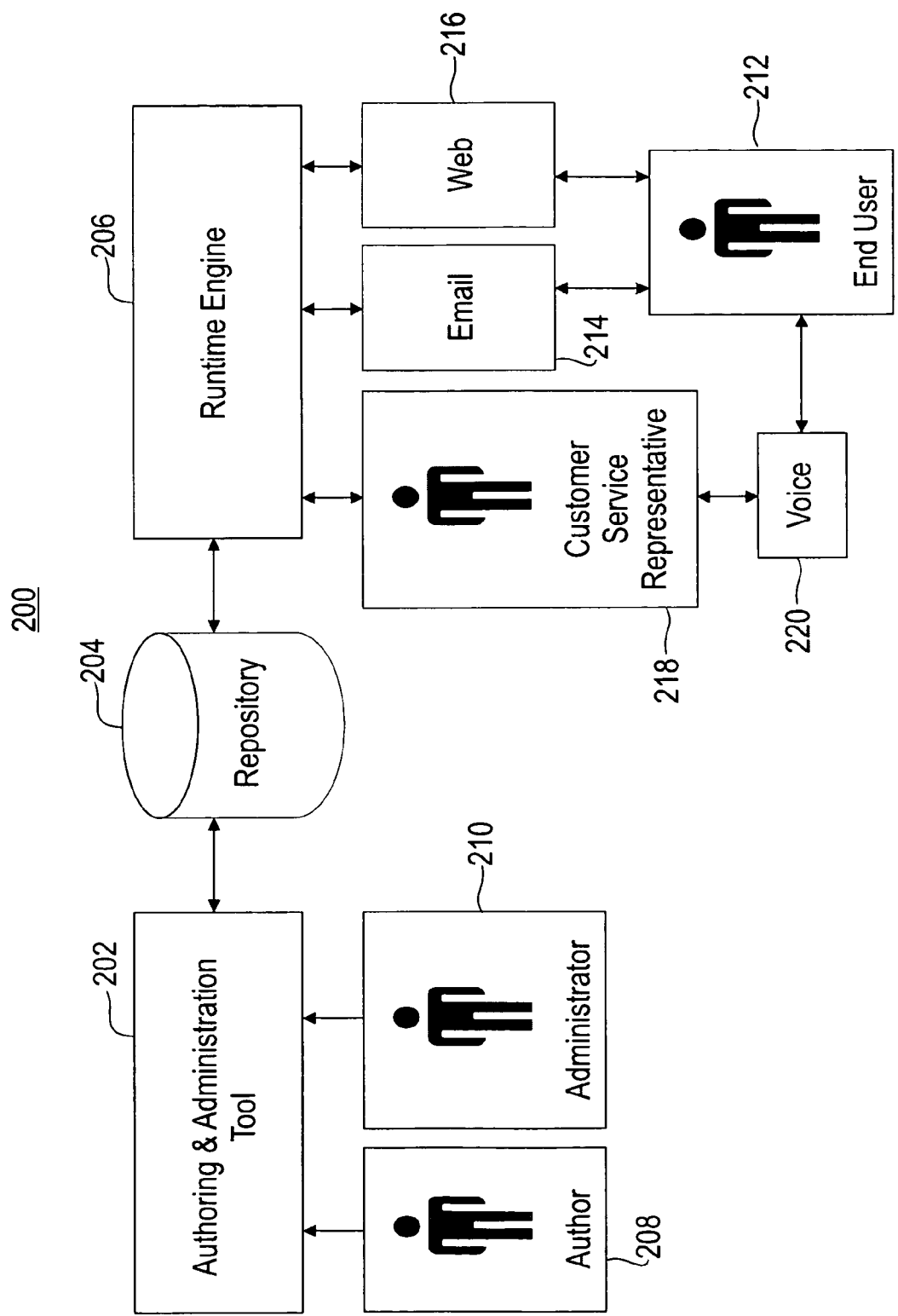
FIG. 2 is a block diagram of a system for specifying, deploying, and dynamically updating work flows, in accordance with embodiments of the present invention.

FIG. 2 is a block diagram of a system for specifying, deploying, and dynamically updating work flows, in accordance with embodiments of the present invention. System 200 implements a framework for work flows and includes an authoring and administration tool 202, a data repository 204, and a runtime component 206 (a.k.a. runtime engine or runtime environment). An author 208 (e.g., business analyst) utilizes authoring and administration tool 202 to create, modify and test work flows. An administrator 210 utilizes authoring and administration tool 202 to activate and deactivate work flows, promote work flows into a production mode, and edit scheduling rules. The authoring and administration tool 202 communicates with repository 204 via a network. Repository 204 stores representations of the work flows created by tool 202, and provides an interface to search, publish and retrieve the work flows stored therein. Further, repository 204 supports versioning of work flows and provides access to all of the versions simultaneously.

Author 208 uses tool 202 to create (a.k.a. specify), edit and test a work flow. After successfully testing the work flow, author 208 or another user of system 200 deploys the work flow to repository 204 and requests a promotion of the work flow into a production environment. Repository 204 stores definitions of both automatic and manual steps of the work flow in a single general-purpose markup language. The deployment of the work flow makes the work flow available for retrieval by administrator 210. Administrator 210 is notified of the request for the promotion. Administrator uses tool 202 to retrieve the work flow from repository 204, inspect and retest the work flow, and promote the work flow into the production environment. In response to the work flow's promotion to the production environment, authoring and administration tool 202 is capable of dynamically updating steps of the work flow. This dynamic updating is described below relative to FIG. 6.

Runtime component 206 receives a request from an end user 212. The end user can be, for example, a customer of a company. The end user's request can, for instance, notify the company of an issue or problem that is to be resolved by system 200. The request from end user 212 is received by runtime component 206 either directly or indirectly. Direct communication of the end user's request can be performed, for instance, via an email system 214 or a web interface 216. An indirect communication of the request can be performed, for example, via a telephone system. In this indirect communication, a human customer service representative (CSR) 218 utilizes the telephone system to initially receive the end user's request in a voice format 220. The CSR 218 communicates the request to runtime component 206 via a computing system (not shown). Alternatively, end user 212 communicates the request indirectly to runtime component 206 via an interactive, automated telephone system that requires no CSR 218.

Runtime component 206 interacts with repository 204 to retrieve, display and execute an appropriate work flow to service the request received from end user 212. The runtime component 206 is a high performance, high availability runtime engine that allows work flows to be dynamically activated and deactivated (i.e., without terminating and restarting the runtime component). Runtime component 206 executes a work flow by utilizing, for example, Java® for XML processing (JAXP), Java® classes, and Agent Building and Learning Environment (ABLE) rule sets and ABLE learning agents. ABLE is a rule engine which is available from International Business Machines Corporation of Armonk, N.Y.

Figure 3:
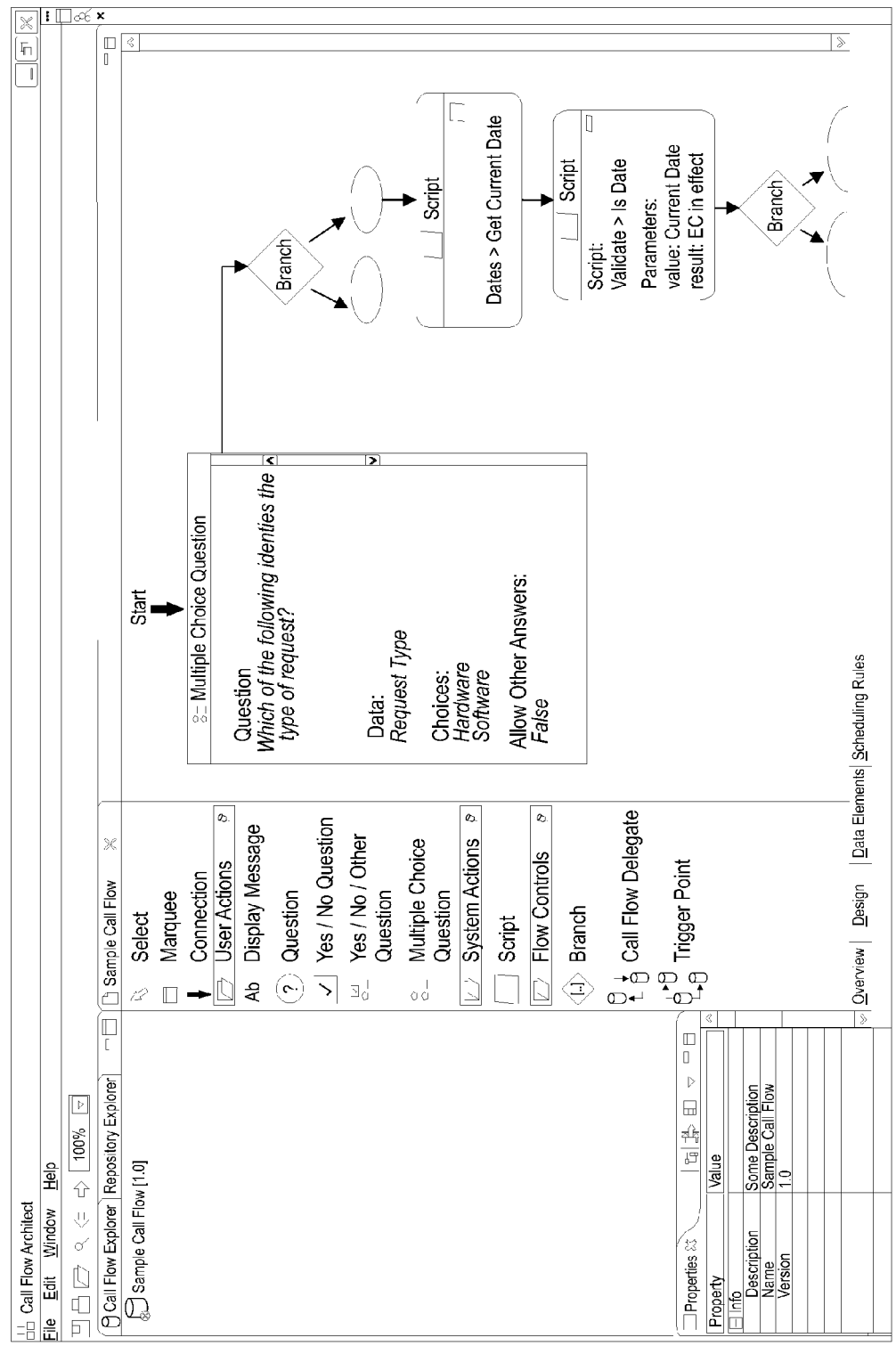
FIG. 3 is an exemplary interface for authoring and administering work flows in the system of FIG. 2, in accordance with embodiments of the present invention.

FIG. 3 is an exemplary interface for authoring and administering work flows in the system of FIG. 2, in accordance with embodiments of the present invention. Interface 300 is used by author 208 (see FIG. 2) to create nodes of a DAG representation of a call flow. A call flow is a work flow that processes a request received via a telephone system. A single interface 300 is used to create work flow nodes for both automatic steps and manual steps. For example, the visual canvas portion of interface 300 (i.e., the panel positioned on the right side of interface 300) includes part of a work flow that includes a node (i.e., a manual node) that specifies a manual step and also includes nodes (i.e., automatic nodes) that specify automatic steps. The node entitled Multiple Choice Question in interface 300 is a manual node that instructs a CSR 218 (see FIG. 2) to perform a manual step (i.e., to ask end user 212 (see FIG. 2) for the type of the end user's request). The two nodes entitled Script are automatic nodes. The Script-entitled automatic node that includes Dates>Get Current Date specifies an automatic step that automatically obtains the current date. The other automatic node in FIG. 3 specifies an automatic step that automatically checks if an Engineering Change was in effect relative to the request.

Other portions of interface 300 include sections labeled Repository Explorer and Properties. The Repository Explorer section lists one or more work flows stored on repository 204 (see FIG. 2) and allows the listed work flows to be accessed for administration tasks. The Properties section lists identifiers and values for properties (e.g., description, name and version) of a specific work flow being created or being accessed from repository 204 (see FIG. 2).

The work flow framework of the present invention provides a uniform representation (i.e., definition) of both manual and automatic steps in a single general-purpose markup language (a.k.a. generalized markup language). The uniform representation in the general-purpose markup language is specified by tool 202 (see FIG. 2) and deployed by tool 202 (see FIG. 2) to repository 204 (see FIG. 2). One example of a general-purpose markup language is eXtensible Markup Language (XML).

In one embodiment, both manual steps and automatic steps of a work flow are represented as XML action elements. That is, a first set of one or more XML action elements represents the one or more automatic steps of a work flow in a one-to-one correspondence. Further, a second set of one or more XML action elements represents the one or more manual steps of the work flow in a one-to-one correspondence. An XML action element is an element defined in an XML schema that represents a step in a process (e.g., a work flow). An element in an XML schema is a logical structure delimited by a start and an end tag. An XML schema is a definition of an XML document that describes and constrains the content of the XML document by indicating which elements are allowed and in which combinations.

FIG. 4 is an XML action element representing a manual step of a work flow capable of being specified, deployed and dynamically updated by the system of FIG. 2, in accordance with embodiments of the present invention. Inquiry step 114 (see FIG. 1B) is represented as XML action element 400. XML action element 400 includes an instruction directed to CSR 218 (see FIG. 2) to perform a step of a work flow manually. That is, XML action element 400 instructs CSR 218 (see FIG. 2) to ask end user 212 (see FIG. 2) the question: "Is this case in reference to our EC letter?"

Although the above-described XML action element representation of a manual step specifies a step to be manually performed, the XML action element may also facilitate automated actions. For example, XML action element 400 represents a human-computer interaction with a computer displaying the question: "Is this case in reference to our EC letter?"

In one embodiment, a manual step represented as an XML action element includes an instruction in a natural language rather than in a computer programming language. This instruction directs a human representative of a help center system to perform the manual step being represented by the XML action element. For example, XML action element 400 includes the instruction that directs a representative to ask the aforementioned question regarding the EC letter. Further, an XML action element representing a manual step does not include an identifier of a software routine to be executed to automatically perform or facilitate an automatic performance of the manual step being represented. For example, an XML action element representing a manual step of a work flow may include an input and an output, but does not include a class name and/or a method name that identifies a software routine to be executed in an object-oriented computing environment.

FIG. 5 is an XML action element representing an automatic step of a work flow capable of being specified, deployed and dynamically updated by the system of FIG. 2, in accordance with embodiments of the present invention. An entitlement lookup step of a work flow is represented as XML action element 500. XML action element 500 executes a software routine named com.ibm.services.EntitlementDatabase, which automatically performs a lookup in a database system and automatically returns the result of the lookup in service-EntitlementObject.

In one embodiment, an automatic step represented as an XML action element includes the following characteristics: class name, method name, input(s), output(s), and exception handling. These characteristics are explicitly specified in an XML action element representing an automatic step to provide sufficient information to identify and execute a software routine. The software routine is executed to automatically perform the automatic step being represented by the XML action element. In XML action element 500, the software routine identified by class name is com.ibm.services.EntitlementDatabase.

The uniform definition of both manual and automatic steps in XML action elements also allows interaction between a manual step and an automatic step. The interaction is performed via an exchange of data between a first XML action element that represents the manual step and a second XML action element that represents the automatic step. As one example of this interaction, an automatic step of a work flow automatically performs a database lookup and a manual step interacting with the automatic step allows a human representative to provide the input to the database that is needed for the lookup. In this example, the input provided by the representative is passed from a first XML action element representing the manual step to a second XML action element representing the automatic step.

By integrating rather than separating manual steps and automatic steps and by uniformly defining both kinds of steps in a general-purpose markup language like XML, the work flow framework of the present invention facilitates help center automation by providing a method of gradually and practically transforming manual steps into automatic steps. Help center operation costs are decreased via this automation.

Further, in contrast to proprietary computer languages, the above-described use of a general-purpose markup language allows multiple national languages to be used in the steps of work flows.

Still further, work flows that utilize XML as disclosed herein promote rapid product evolution. A work flow for servicing a product requires frequent updates to address product upgrades. Because of the wide availability of tools that support the XML standard, architects can easily edit work flows to maintain synchronization between the servicing of the product and new product features.

Yet further, the logic utilized by the present invention facilitates reusability. Since the logic is entirely encapsulated in easy-to-read XML documents, any type of interface can be easily generated for the logic. The interface is not limited to a customer contacting a CSR as described above. Other interfaces are just as easily generated (e.g., a self-help website, interaction via email, or a chat bot/client). Thus, the present invention facilitates the availability of multiple types of interfaces to a customer, where the customer obtains consistent answers regardless of the type of interface selected.

Updating a Work Flow

Figure 6:
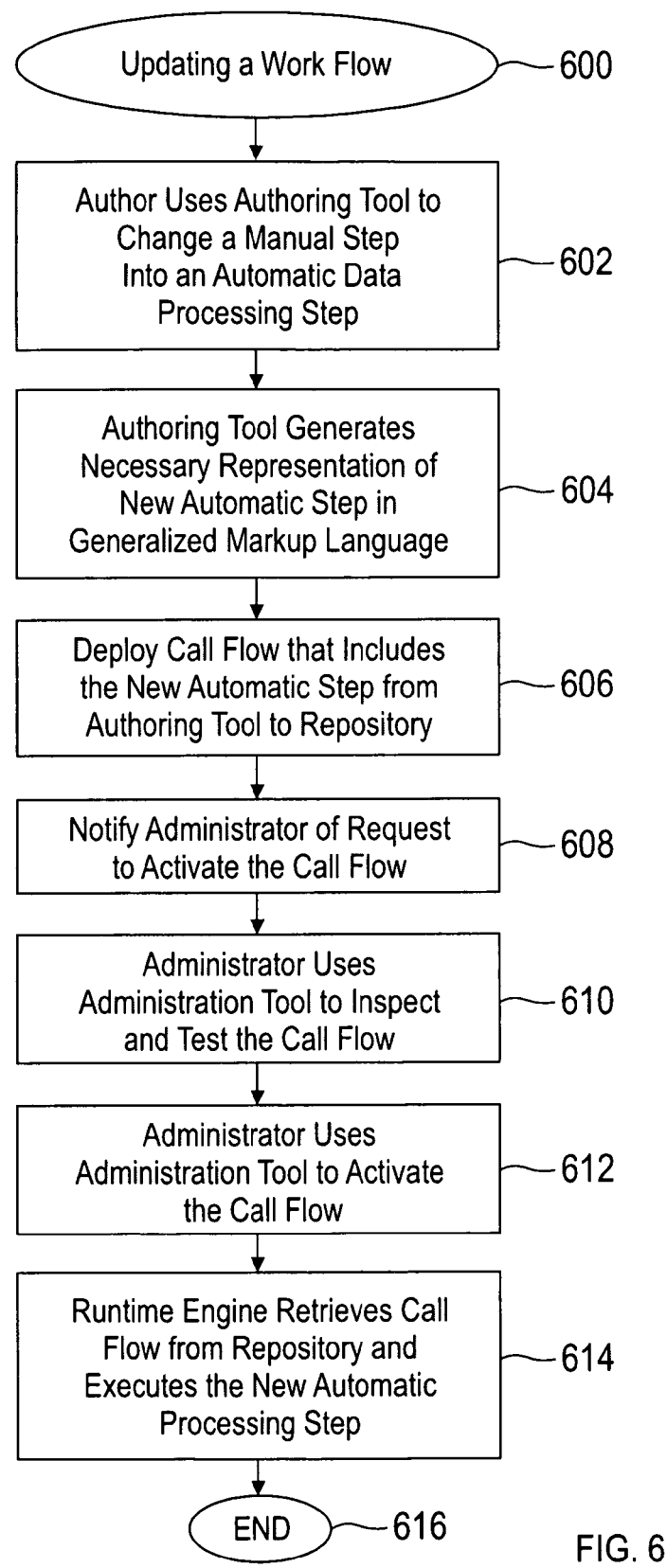
FIG. 6 is a flow chart of a work flow update process implemented by the system of FIG. 2, in accordance with embodiments of the present invention.

FIG. 6 is a flow chart of a work flow update process implemented by the system of FIG. 2, in accordance with embodiments of the present invention. The process for updating a work flow begins at step 600. Although the subsequent process steps of FIG. 6 refer to a call flow, it will be understood by those skilled in the art that the same process can be applied more generally to any type of work flow. In step 602, author 208 (see FIG. 2) uses authoring and administration tool 202 (see FIG. 2) to transform a manual step of a call flow to a new automatic step. The new automatic step replaces the manual step in the call flow. An identifier of a software routine is specified (e.g., by author 208 using tool 202 of FIG. 2) and included in a new XML action element that is generated to represent the new automatic step. The software routine identified in the new XML action element is to be executed by runtime component 206 (see FIG. 2) to automatically perform or facilitate the automatic performance of the new automatic step.

In one embodiment, the identifier included in the new XML action element includes a class name and a method name. The class name and method name are utilized to facilitate executing the identified software routine in an object oriented computing environment.

Further, the update of the manual step to the new automatic step can be performed dynamically. For example, step 602 is performed without requiring runtime component 206 (see FIG. 2) to be terminated and restarted.

In step 604, authoring and administration tool 202 (see FIG. 2) generates the necessary representation of the new automatic step of step 602 in generalized markup language (e.g., XML). In step 606, author 208 (see FIG. 2) or administrator 210 (see FIG. 2) uses tool 202 (see FIG. 2) to deploy the new automatic step from tool 202 (see FIG. 2) to repository 204 (see FIG. 2).

In step 608, author 208 (see FIG. 2) notifies administrator 210 (see FIG. 2) of a request to activate the call flow. The notification in step 608 is received by the administrator via telephone, email, instant message, etc. In step 610, administrator 210 (see FIG. 2) uses administration tool 202 (see FIG. 2) to inspect and test the call flow. In step 612, administrator 210 (see FIG. 2) uses administration tool 202 (see FIG. 2) to activate the call flow. In step 614, runtime component 206 (see FIG. 2) retrieves the call flow from repository 204 (see FIG. 2) and executes the new automatic step. The update process ends at step 616.

In one embodiment, the process of FIG. 6 is repeated to update multiple manual steps of a work flow to automatic steps. In this way, a work flow is transformed to a completely automated work flow (i.e., a work flow that includes no manual steps) over a selectable period of time.

FIG. 7 is an XML action element representing a manual step of a work flow to be updated so that the manual step is transformed into the automatic step of FIG. 5, in accordance with embodiments of the present invention. Without performing the updating process of FIG. 6, the execution of XML action element 700 by runtime component 206 (see FIG. 2) displays the following message on a web page: "Is this client entitled for this type of service? Look up the pertinent paperwork in file."

Applying the updating process of FIG. 6 to XML action element 700 transforms the manual step into a new automatic step. The new automatic step is represented as XML action element 500 (see FIG. 5). After the updating process is performed, execution of the new XML action element 500 (see FIG. 5) does not display the above-described message. Instead, runtime component 206 executes the software routine com.ibm.services.EntitlementDatabase, which automatically performs a lookup in a database system and returns the result in serviceEntitlementObject.

Computing System

Figure 8:
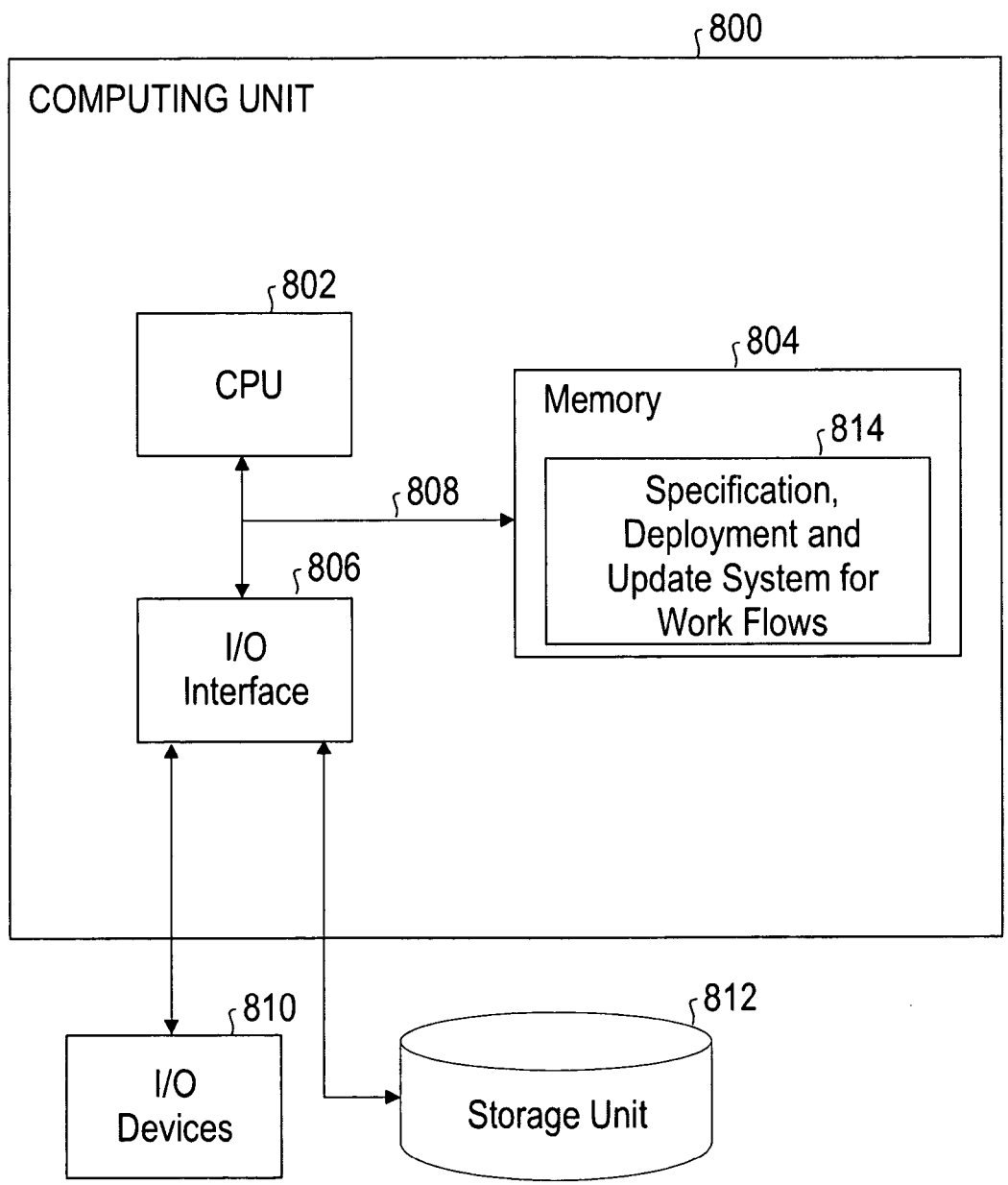
FIG. 8 is a computing system for implementing the system of FIG. 2 and the process of FIG. 6, in accordance with embodiments of the present invention.

FIG. 8 is a block diagram of a computing unit 800 for implementing the system of FIG. 2 and the process of FIG. 6, in accordance with embodiments of the present invention. Computing unit 800 is suitable for storing and/or executing program code of a work flow specification, deployment and update system 814, and generally comprises a central processing unit (CPU) 802, a memory 804, an input/output (I/O) interface 806, a bus 808, I/O devices 810 and a storage unit 812. CPU 802 performs computation and control functions of computing unit 800. CPU 802 may comprise a single processing unit, or be distributed across one or more processing units in one or more locations (e.g., on a client and server).

Local memory elements of memory 804 are employed during actual execution of the program code of specification, deployment and update system 814. Cache memory elements of memory 804 provide temporary storage of at least some program code in order to reduce the number of times code must be retrieved from bulk storage during execution. Further, memory 804 may include other systems not shown in FIG. 8, such as an operating system (e.g., Linux) that runs on CPU 802 and provides control of various components within and/or connected to computing unit 800.

Memory 804 may comprise any known type of data storage and/or transmission media, including bulk storage, magnetic media, optical media, random access memory (RAM), read-only memory (ROM), a data cache, a data object, etc. Storage unit 812 is, for example, a magnetic disk drive or an optical disk drive that stores data such as XML representations of work flows. Moreover, similar to CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including a display monitor, keyboard, mouse, printer, speakers, handheld device, printer, facsimile, etc. Bus 808 provides a communication link between each of the components in computing unit 800, and may comprise any type of transmission link, including electrical, optical, wireless, etc.

I/O interface 806 also allows computing unit 800 to store and retrieve information (e.g., program instructions or data) from an auxiliary storage device (e.g., storage unit 812). The auxiliary storage device may be a non-volatile storage device (e.g., a CD-ROM drive which receives a CD-ROM disk). Computing unit 800 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of gateway 102 for use by or in connection with a computing unit 800 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk-read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of updating steps of a work flow in a computing system, comprising:

creating a work flow in a computing system, said work flow being an ordered set of steps capable of performing a routing of a request initiated by a user of said computing system and a servicing of said request, said set of steps comprising one or more automatic steps and one or more manual steps, said one or more automatic steps to be performed by one or more computing applications included in said computing system, and said one or more manual steps to be performed by one or more representatives who are human;

representing said one or more automatic steps in a first set of one or more eXtensible Markup Language (XML) schemas in a one-to-one correspondence, wherein each XML schema of said first set includes an identifier of a software routine to be executed to automatically perform a corresponding automatic step of said one or more automatic steps;

representing said one or more manual steps in a second set of one or more XML schemas in a one-to-one correspondence, wherein each XML schema of said second set includes an instruction directing a representative of said one or more representatives to perform a corresponding manual step of said one or more manual steps, and does not include an identifier of a software routine to be executed to automatically perform said corresponding manual step;

executing said work flow, wherein said executing said work flow includes:
 executing said first set of one or more XML schemas,
 executing said second set of one or more XML schemas, and
 performing said routing and said servicing, and wherein said executing said work flow is performed by an execution of a runtime component of said computing system; and
representing a manual step of said one or more manual steps in an XML schema to be added to said first set, wherein said representing said manual step includes:
 transforming said manual step into an automatic step represented in said XML schema, said XML schema including a first identifier of a first software routine to be executed to facilitate automatically performing said automatic step, and
 adding a class name and a method name to said XML schema, said class name and said method name identifying said first software routine, wherein said software routine is to be executed in an object-oriented computing environment, and
 wherein said representing said manual step is performed without requiring a termination of said execution of said runtime component.

* * * * *